(12) United States Patent
De Angelis et al.

(10) Patent No.: US 9,894,185 B2
(45) Date of Patent: Feb. 13, 2018

(54) SYSTEM AND METHOD FOR CONDITION-BASED APPLICATION LOGIC SHIFTING BETWEEN A CLIENT AND A SERVER

(71) Applicant: Software AG, Darmstadt (DE)

(72) Inventors: Vittorio De Angelis, Schwalbach (DE); Rocco De Angelis, Schwalbach (DE)

(73) Assignee: Software AG, Darmstadt (DE)

( * ) Notice: Subject to any disclaimer, the term of this patent is extended or adjusted under 35 U.S.C. 154(b) by 259 days.

(21) Appl. No.: 14/571,917

(22) Filed: Dec. 16, 2014

(65) Prior Publication Data

US 2016/0173648 A1 Jun. 16, 2016

(51) Int. Cl.
*H04L 29/06* (2006.01)
*H04L 29/08* (2006.01)
*G06F 9/54* (2006.01)

(52) U.S. Cl.
CPC .............. *H04L 67/42* (2013.01); *G06F 9/547* (2013.01); *H04L 67/10* (2013.01); *H04L 67/40* (2013.01)

(58) Field of Classification Search
CPC ......... H04L 67/42; H04L 67/40; H04L 67/10; H04L 67/02; H04L 26/06047; G06F 9/547
USPC ........................................................ 709/203
See application file for complete search history.

(56) References Cited

U.S. PATENT DOCUMENTS

| | | | | |
|---|---|---|---|---|
| 5,249,293 A | * | 9/1993 | Schreiber | G06F 9/543 708/815 |
| 5,802,367 A | * | 9/1998 | Held | G06F 9/445 719/332 |
| 6,336,134 B1 | * | 1/2002 | Varma | H04L 12/1813 709/201 |
| 6,377,975 B1 | * | 4/2002 | Florman | G06F 9/505 709/203 |
| 6,901,596 B1 | * | 5/2005 | Galloway | G06F 9/544 718/102 |
| 7,617,273 B2 | * | 11/2009 | Rocchetti | G06F 9/5044 709/203 |
| 2001/0042058 A1 | * | 11/2001 | Harrington | G06F 9/5016 |
| 2002/0059212 A1 | * | 5/2002 | Takagi | G06F 9/548 |
| 2002/0059360 A1 | * | 5/2002 | Ito | H04L 29/06 709/203 |
| 2002/0062333 A1 | * | 5/2002 | Anand | G06F 9/5027 718/105 |

(Continued)

OTHER PUBLICATIONS

"Software AG Process Live", Software AG, Aug. 28, 2013, [Online]. <http://www.softwareag.com/special/processlive/>.

(Continued)

*Primary Examiner* — Imad Hussain
(74) *Attorney, Agent, or Firm* — Posz Law Group, PLC

(57) ABSTRACT

A system for condition-based application logic shifting between a client and a server uses a stub generator, a function processor, and a client stub. Both the stub generator and the function processor are located in the server and the client stub is generated by the stub generator. Normally an application function's execution occurs on the client. The client stub determines whether or not a client shift condition (CSC) exists for shifting an application function's execution from the client to the server when the CSC does exist, and shifting the application's function back to the client when it is determined that the CSC does not exist (or no longer exists).

21 Claims, 6 Drawing Sheets

(56) References Cited

U.S. PATENT DOCUMENTS

| | | | | |
|---|---|---|---|---|
| 2003/0101265 | A1* | 5/2003 | Dantzig | G06F 9/505 709/226 |
| 2003/0217158 | A1* | 11/2003 | Datta | G06F 9/54 709/228 |
| 2010/0281528 | A1* | 11/2010 | Hayton | G06F 8/60 726/7 |
| 2011/0231680 | A1* | 9/2011 | Padmanabhan | G06F 1/3209 713/310 |
| 2011/0277027 | A1* | 11/2011 | Hayton | H04L 63/0815 726/8 |
| 2012/0144047 | A1* | 6/2012 | Armstrong | H04L 12/4633 709/228 |
| 2012/0272210 | A1* | 10/2012 | Ni | G06F 8/52 717/106 |
| 2014/0025828 | A1* | 1/2014 | Li | G06F 9/505 709/226 |
| 2014/0120889 | A1* | 5/2014 | Shuman | H04W 4/10 455/416 |
| 2014/0179421 | A1* | 6/2014 | Quinn | A63F 13/00 463/31 |
| 2014/0280509 | A1* | 9/2014 | Merrells | H04L 67/42 709/203 |
| 2014/0359146 | A1* | 12/2014 | Metzler | G06F 9/547 709/228 |
| 2016/0162009 | A1* | 6/2016 | Hamilton, II | G06F 1/3203 713/320 |

OTHER PUBLICATIONS

"Spring Project", Pivotal Software, Inc. [Online] Printed Dec. 15, 2014. <https://spring.io/>.

"Remote Method Invocation", Oracle and/or its affiliates, Copyright 1995-2014, [Online] Printed Dec. 15, 2014. <http://www.oracle.com/technetwork/javatjavase/tech/index-jsp-136424.html>.

"Lucidchart", Lucidchart. [Online] Printed Dec. 15, 2014. <https://www.lucidchart.com/>.

"Node.js", Joyent, Inc., 2014. [Online] Printed Dec. 15, 2014. <http://nodejs.org/>.

"Apache Thrift", Apache Software Foundation, 2014. [Online] Printed Dec. 15, 2014. <https://thrift.apache.org/>.

* cited by examiner

SYSTEM AND METHOD FOR CONDITION-BASED APPLICATION LOGIC SHIFTING BETWEEN A CLIENT AND A SERVER

TECHNICAL FIELD

The technical field relates in general to dynamically adjusting the environment for executing an application in response to a variety of conditions.

BACKGROUND

In recent years there has been rapid development in emerging technology regarding "intelligent" mobile devices capable of running a variety of applications. However, the advancements in these devices have also led to higher costs and continued problems with a myriad of deficiencies related to intelligent mobile devices (for example, battery power, network bandwidth).

Examples of some of these deficiencies include limitations regarding battery power, network bandwidth and availability, device temperature, and latency sensitive applications. The following is an example to illustrate the problem in a practical manner, but these types of problems are widespread in relation to many areas.

The Software AG ARIS web product suite is one of the market's leading business process management tools. Customers use ARIS to document and analyze their internal processes and organization. The ARIS Connect Web Platform (a HTML/JavaScript based tool) provides a set of RIAs (Rich Internet Applications), and a mass of JavaScript based business logic, allowing the users to browse, read, create and write their business processes using a web browser. An example of one of these applications is the ARIS web modeling tool shown in FIG. 6.

Making tools and services used daily in businesses, such as the ARIS web model 601, accessible via mobile devices is becoming increasingly more crucial and important. The ability to be constantly connected to the tools and services of our daily business increases mobility and efficiency of the business users and makes businesses more flexible and competitive. In this context, battery life and the efficient usage of the CPU has become an important success factor for all web-based applications delivered over the web to mobile devices. However, the functional range of web application increases from day to day and more and more business applications require complex calculations to support the numerous daily business use cases.

A common and simple approach to solve this conflict, used by most of the current web based applications, is to shift long and expensive (in terms of CPU and battery usage) calculations to the server-side part of the web application. An example could be to shift the expensive routing algorithm execution of a car navigation application from to mobile device to the server-side part of the application. However, such an approach has significant disadvantages:

Costs. Shifting the execution of complex and expensive calculations (in terms of CPU and battery usage) to the server-side of the application produces additional costs for the server infrastructure. In particular the costs for cloud-based infrastructures could significantly increase if third-party vendors host the infrastructure.

Inflexible. Once the execution of complex and expensive calculations has been moved to the server-side, the execution cannot be moved back to the client device. If the mobile device is connected to an external power source or has sufficient battery capacity left it is not necessary to move complex calculation to the server-side. In such cases, distributing the calculation load between all connected mobile devices would be desirable and reduce the workload and costs for the server infrastructure.

Since, all existing approaches are solving only the problem of shifting application code/logic from client-side to the server-side or vice-versa using common paradigms, the following discussion provides an overview of same frameworks and systems making use of these paradigms and explains why they are not solving the problems previously described.

1. Systems/Frameworks Using Remote Procedure Calls (RPCs)

A remote procedure call is an inter-process communication that allows a client application in a client-server scenario to execute a subroutine or procedure on the server-side and to get the result back, while hiding all details of the necessary data transformation, unpacking and protocol handling for the remote interaction.

Systems and frameworks making use of this approach handle all that is necessary to make the remote interprocess communication as seamless and transparent as possible. In addition they provide powerful solutions for transferring the input data, necessary for the execution of remote procedures, from the client to the server by having as few restrictions as possible on the data model. Some frameworks providing RPC solutions include: (1) Spring Web MVC framework and (2) Java Remote Method Invocation (Java RMI).

Existing RPC systems and frameworks focus on the seamless and transparent execution of remote procedures. They do not provide any seamless and transparent solution for switching the execution of an application procedure from the client-side to the server-side if required to keep the services available as long as possible on the mobile device.

2. Systems/Frameworks Using Cross-platform Runtime Environments

Cross-platform runtime environments are computer software solutions and systems, which allow computer software to be executed on multiple computer platforms and architectures. For example, a cross-platform environment allows an application to run on Microsoft Windows Server on x86 architecture or on Android Platform on mobile devices based on a totally different architecture by only writing the application code once.

Some of these environment systems do not even require recompiling the application code and allow the use a single programming language for all supported platforms. Web applications are typically described as cross-platform because they can be executed from various web browsers running on different operating systems and devices. If web applications are paired with cross-platform runtime environment systems which support the browser's programming language (for example, JavaScript) on the server-side, this leads to systems which can easily and seamlessly shift from the client to the server and vice-versa.

Systems and frameworks making use of this approach handle all the necessary stuff to make the cross-platform execution of the application logic as seamless and transparent as possible. The main focus of these systems is the ability to write the application code only once and to use it on any platform wherever needed within the target system architecture. Some frameworks providing cross-platform/language solutions: (1) Node.js and (2) Apache Thrift.

These systems do not provide any seamless and transparent solution for switching the execution of an application procedure from the client-side to the server-side if required to keep the services, depending on this procedure, available as long as possible on the mobile device.

3. Missing Approaches in Traditional Systems

Existing solutions have their focus on the seamless and transparent execution of an application logic located on the server-side by using an inter-process communication (RPC solutions) or the shifting of client-side code to the server-side or vice versa (cross-platform solutions). These approaches assume that it is possible to make a decision at the beginning of a project regarding whether specific application logic has to be executed on the client-side or the server-side. These solutions have the following disadvantages and do not cover the following aspects:

Inflexible. Once a decision has been made on executing specific application logic on the client-side or server-side, there is no possibility to shift this logic back on the client-side or server-side at runtime if requirements or external influences of the application change. A shift of the application logic always requires changes on the application implementation and additional coding efforts.

Does not Fit the Requirements of Mobile Devices. Mobile devices are characterized by less powerful processing units and a limited power source (the battery). For the end user this means that he has to make a decision for which application and use cases he wants to spend the limited resources. In most cases this decision depends on a variety of different factors and changes from time to time. If the battery of the device is fully charged or an external power source is available, the user perhaps has no problem executing expensive calculations on the device. However, in cases when there is no external power source available and it is important for the user to have other use cases (for example, to be reachable via messaging tools) available as long as possible, the user would prefer to execute such calculations on the server-side. However, from a cost-benefit perspective of the service or use case provider it would be preferable to execute as many as possible of the calculations on the mobile-device-side to reduce the costs for the server infrastructure and to spread the calculation load. A seamless, transparent and implementing effort reducing solution covering these aspects, problems and conflicts is not provided by the traditional approaches.

Higher Implementation Costs. Handling the requirements of mobile device application use cases requires a profound knowledge of different mobile device application programming interfaces to provide a battery status based behavior for the execution of application logic. This kind of hardware-near implementation is outside of the daily implementation tasks of a typical web developer, especially with regard to web based applications running in a web browser.

This leads to additional and excessive implementation efforts which are not related to the business logic of the application. Existing solutions do not provide a comfortable and implementation effort reducing approach hiding these aspects so that the web developer can focus on the actual application business logic.

One or more embodiments discussed herein can address the aforementioned problems with traditional systems, by running applications that automatically detect these deficiencies in real time and dynamically adjusting the environment in which the application runs (for example, switching it from the mobile device to the server and if necessary back again) to overcome a variety of deficiencies. The present system allows executing the application logic of browser-based mobile applications on the mobile devices themselves or the server-side part of the application, depending on the battery status of the mobile device. This happens in a more universal, transparent, simple and less costly way than the traditional approaches.

SUMMARY

Accordingly, one or more embodiments provide a method, system and/or non-transitory computer readable medium for condition-based application logic shifting between a client and a server.

Accordingly, an embodiment provides a system for condition-based application logic shifting between a client and a server. The system comprises a stub generator located in the server; a function processor, located in the server, for executing a function; and a client stub generated by the stub generator. The client stub is configured by the stub generator to: determine whether a client shift condition (CSC) exists for shifting an application function's execution from the client to the server; package parameters when a CSC exists; execute a remote call to the server, when a CSC exists, so that the function processor executes the function in the server; and return a result of the executed function to the client. The client stub is further configured to: determine if a CSC does not exist or no longer exists; and execute the function in the client if there is no CSC.

According to another embodiment, the stub generator is configured to: read a configuration file from storage located in the server; read and parse a returned code file, from a web application server, that represents the function; generate the client stub and add it to the returned code file to generate a modified code file; add helper functions to be used by the client stub to the modified code file; and return the modified code file to the web application server.

According to yet another embodiment, the function processor is configured to: read a configuration file from storage located in the server; receive remote procedure call data from the client; unpack and transform the remote procedure call data; map the remote procedure call data with the function to be executed; execute the function; pack and transform a result of the executed function; and return the result of the executed function to the client stub.

According to another embodiment, there are provided methods according to the above. In a further embodiment, the processor is further configured to perform according to the above methods. Yet another embodiment provides a non-transitory computer readable medium, which can perform a method according to one or more of these embodiments.

One, or a combination of more than one, or all, of the above embodiments, can be combined and provided as a single document.

Moreover, the purpose of the abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

I. Overview

Figure 1:
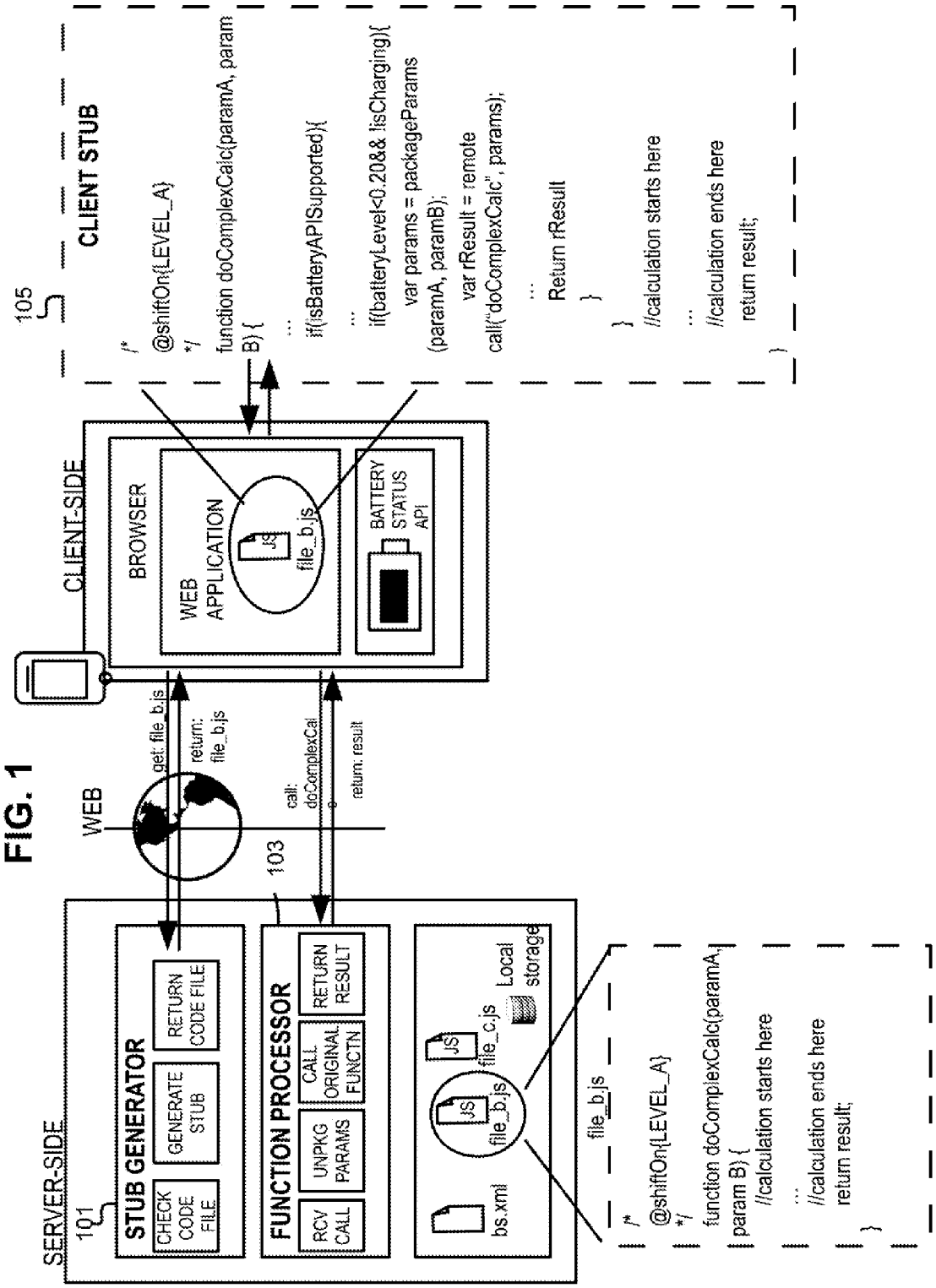
FIG. 1 is a block diagram illustrating an example of the basic procedure of the system.

In overview, the present disclosure concerns a system for condition-based application logic shifting between a client-side and a server-side. Triggered by a dynamically occurring deficiency or combination of deficiencies on a mobile device (such as a battery running low, bandwidth, signal, and the like), the system enables an application to be dynamically moved from running on the client-side to running on the server-side. Additionally, should the deficiency be rectified (for example, by plugging the mobile device into a power source), the application can be dynamically moved back from running on the server-side to running on the client-side. The system automatically detects certain deficiencies or combinations and dynamically switches the application to avoid the consequences with the ability to also switch back when the deficiency has been resolved.

The present system targets disadvantages and uncovered aspects of the existing common approaches. There are three main aspects of the system. First, there is seamless and transparent shifting of the execution of application logic from the client-side to the server-side or vice versa depending on the status or the characteristics of one or more hardware resources of the mobile device, for example, the battery status of the mobile device. Second, all hardware-near aspects of the implementation are hidden, so there is no need for profound knowledge of device specific application programming interfaces. Third, the system is a declarative solution that allows the system to describe the status or characteristic-based shifting behavior (for example, the battery-based shift behavior) without any additional implementation efforts.

II. Aspects of the Approach

The system can use function annotations to describe conditions to determine whether a corresponding function code should be executed on the client device or on the remote server-side part depending on the status or the characteristics of one or more hardware resources (for example, the battery status) of the mobile device. The added annotation information is used to extend in a seamless and transparent way the original application function by a server-side generated code, handling all aspects of the status or characteristics-based (for examples, battery status-based) execution shifting. The generated code added by the system handles the testing of the shifting conditions, the packing and the transferring of the data necessary to perform the remote call, without changing or influencing the behavior or the result of the original function. In addition the generated code checks whether the target device supports the necessary and/or desired application programming interfaces for accessing the status or characteristics of the mobile resource (for example, the battery status) and automatically hides all added functionalities in case the necessary and/or desired interfaces are not supported by the target device. The system can automatically scan, e.g., on the server-side, for files containing annotated functions and can add the battery based shift support transparently to the original code.

The fundamental principles of the operation of the system are explained through the example of the battery status-based shifting. However, any status or characteristic of a mobile device resource can be the basis for a shift condition. The shift condition is not limited to the battery status.

Referring now to FIG. 1, a block diagram illustrating an example of the basic procedure of the system will now be discussed and described. The system is composed of three main components: the Stub Generator 101, the Function Processor 103 and the Client Stub 105.

(1) Stub Generator. The Stub Generator 101 is responsible for the generation and the injection of the client-side stub code which is responsible for the battery status based shifting of the function execution from the client-side to the server-side. The Stub Generator 101 checks all specified code files delivered by the web server for functions which have been annotated with one of the defined markers describing which kind of shift behavior is desired for the annotated function. If a corresponding function has been found, the Stub Generator 101 injects a small piece of code at the beginning of the function. This code can handle all procedures necessary to shift the function execution from the client-side to the server-side. In a last step, the Stub Generator 101 adds same additional helper functions needed by the generated code to the file and returns the file back to the response chain of the web server, which returns the file back to the client. The Stub Generator 101 is controlled by a small configuration file which is part of the system. The configuration file contains information about the type of code files which have to be checked by the Stub Generator and some settings controlling the shift behavior and thereby the generated stub code.

(2) Function Processor. The Function Processor 103 is responsible for the execution of the target function on the server-side and for sending the result back to the client. It is based on a cross-platform runtime environment like Node.js (5) and therefore able to execute the function code which was originally foreseen for the client platform (for example, the web browser). First, the Function Processor 103 has to identify the target function of the remote procedure call. After the file containing the target function has been loaded from the local storage the Function Processor 103 unpacks the function parameters and calls the target function by passing the given parameters. After receiving the result back from the target function the Function Processor 103 packs the function result and sends the result back to the Client Stub 105 on the client-side.

(3) Client Stub. The Client Stub 105, a representative example of which is illustrated in FIG. 1, is generated by the Stub Generator 101 and is a small piece of code injected by the Stub Generator 101 at the beginning of the function. This code extends the function by the capability of shifting the execution of the function seamless and transparent to the server-side of the application if a defined battery status is present on the target mobile device. The generated code and the behavior of the Client Stub 105 are controlled by the annotations which have been added to the corresponding function. If the battery capacity falls, for example, below a defined value and the mobile device is not recharging the battery, the Client Stub 105 will execute the function on the server-side and return the value. The Client Stub 105 code checks the status of the battery every time the corresponding function is executed. Once the mobile device is connected to an external power source again, for example, and the battery status changes, the Client Stub 105 will no longer execute the function on the server-side, if this was the defined behavior for the corresponding function.

III. Detailed Description of Components and Flow

The following sections describe the main components in detail and how they work together.

A. The Stub Generator

Figure 2:
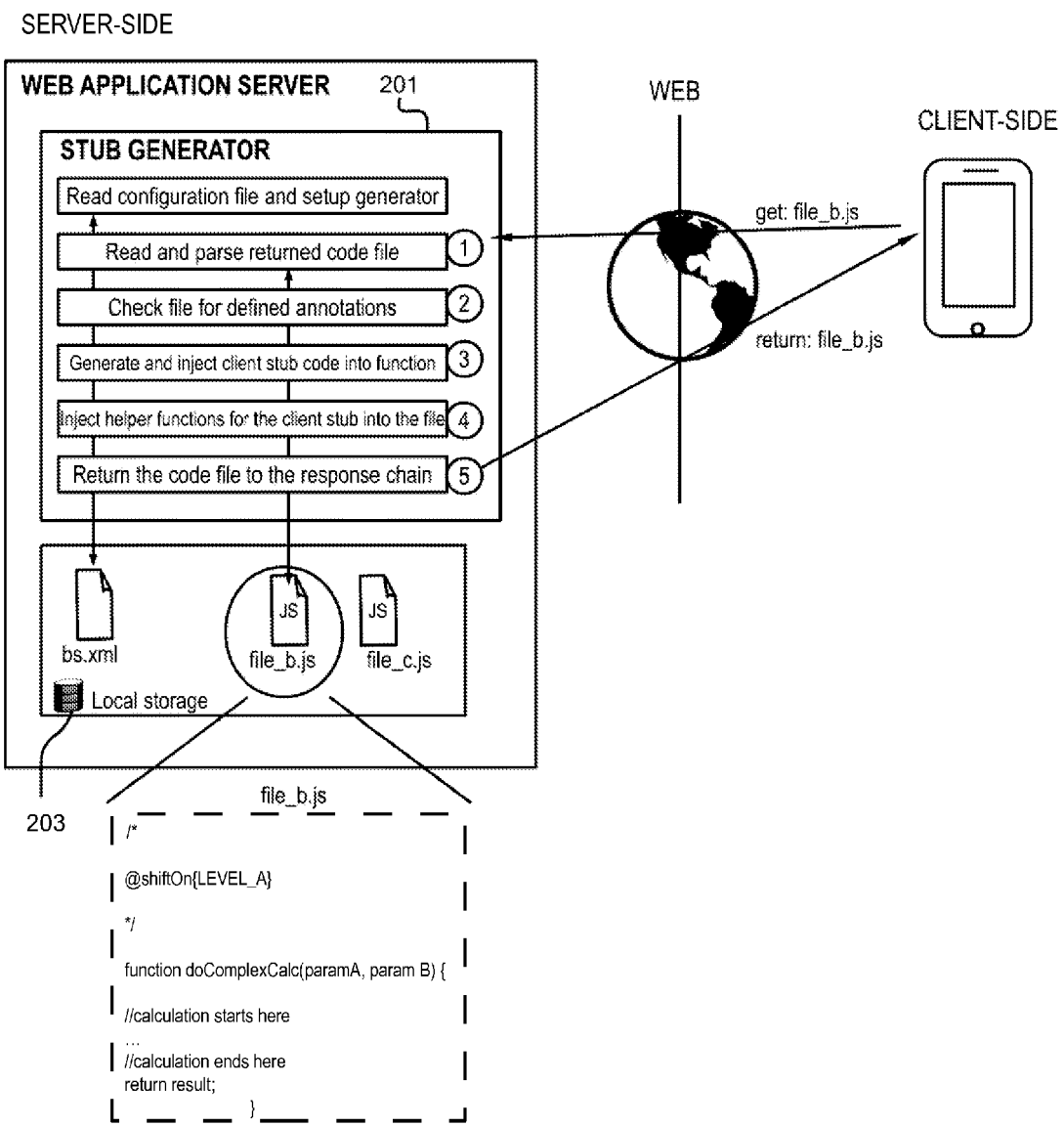
FIG. 2 is a block diagram illustrating the stub generator.

The Stub Generator is responsible for the generation and the injection of the client-side stub code which is responsible for the battery status-based shifting of the function execution from the client-side to the server-side. The Stub Generator is nested within the request-response-chain of the web application server and checks all requests and responses for specific application code files. FIG. 2 is a block diagram illustrating the stub generator.

The Stub Generator 201 checks all incoming requests which request code files of a defined type. The code file type to be checked by the Stub Generator 201 is described within a system configuration file, which is used to control and to configure the Stub Generator 201. The Stub Generator 201 procedure is defined by the following steps which are processed in the order listed below:

Read Configuration File and Setup Generator. This is the initialization step of the Stub Generator 201 which occurs only once while the Stub Generator 201 is created and added to the request-response chain of the application server. There are numerous types and implementations of web (application) servers and frameworks which allow adding components and filters to the request-response chain to manipulate or to extent the requested file or data.

During the initialization step the Stub Generator 201 reads a defined configuration file from the local storage 203 of the server which is used to configure the behavior of the Stub Generator 201. After the configuration file has been parsed and processed the configuration data is internally stored by the Stub Generator 201. This data is used later to determine the types of code files which have to be processed by the generator as well as an input for the generation of the client stub code.

1. Read and Parse Returned Code File

This step occurs for each request sent to the web (application) server. As part of the request-response chain the Stub Generator 201 receives the request and response information from the web (application) server containing the information about the requested file or resource and can handle and return the requested file or data if he is responsible for the requested resource. In this step the Stub Generator 201 checks if the requested file or resource matches one of the specified code file types. This is done by comparing the filename of the requested file or resource with a list of filename patterns defined by the configuration of the Stub Generator 201. If there is at least one match, the requested file is loaded from the local storage and parsed by the Stub Generator 201. After the file has been parsed and transformed in proces sable data structure, the file or resource is checked for annotations. The parsing and transformation of the source code contained in the requested file or resource is solved by existing systems and frameworks and will therefore not be explained in this document.

2. Check File for Defined Annotations

In this step the data structure generated from the parsed source code is scanned for specific annotations. If a valid and defined annotation has been found, the annotation data as well as the corresponding function is passed to the client stub generation and injection step. A list of the supported annotations, the corresponding annotation syntax and their functioning is described in detail in a subsequent section.

3. Generate and Inject Client Stub Code into Function

In this step the annotation data is used to generate a client-side stub code reflecting the shift conditions described by the annotation data. This step is performed for every function which has been marked with a valid annotation and returned by the previous step. The generated code is responsible for the seamless and transparent shift of the execution from the client-side to the server-side and vice versa. The conditions for the shift are generated into the client-side code and described by the function annotations defined by the developer.

4. Inject Helper Functions for the Client Stub into the File

Before the modified file is sent back to the client, numerous helper functions used by the client stub code are added to the requested file. These functions are used by the client stub to pack the function parameter data, to perform the remote call and to check the battery status API support of the target device. The helper functions are added only once to each code file processed by the Stub Generator 201.

5. Return the Code File to the Response Chain

In the last step, the modified data is returned to the request-response chain of the web (application) server which sends the file back to the client.

B. The Function Processor

The Function Processor is responsible for the execution of the annotated functions on the server-side and for making the corresponding functions available to the client stub via a remote procedure call approach. The Function Processor implementation is based on cross-platform runtime environments like Node.js (5) allowing the Function Processor to execute the client code (for example, JavaScript code which is foreseen for the execution within the client browser) on the server-side and to return the result back to the client.

In addition, the Function Processor checks the executed function for defined dependencies and also loads the code files into the cross-platform environment. If, for example, a function has references to functions not defined in the same code file, the dependencies can be defined in the system configuration file and the Function Processor ensures that the corresponding files are also loaded before the function is executed.

Figure 3:
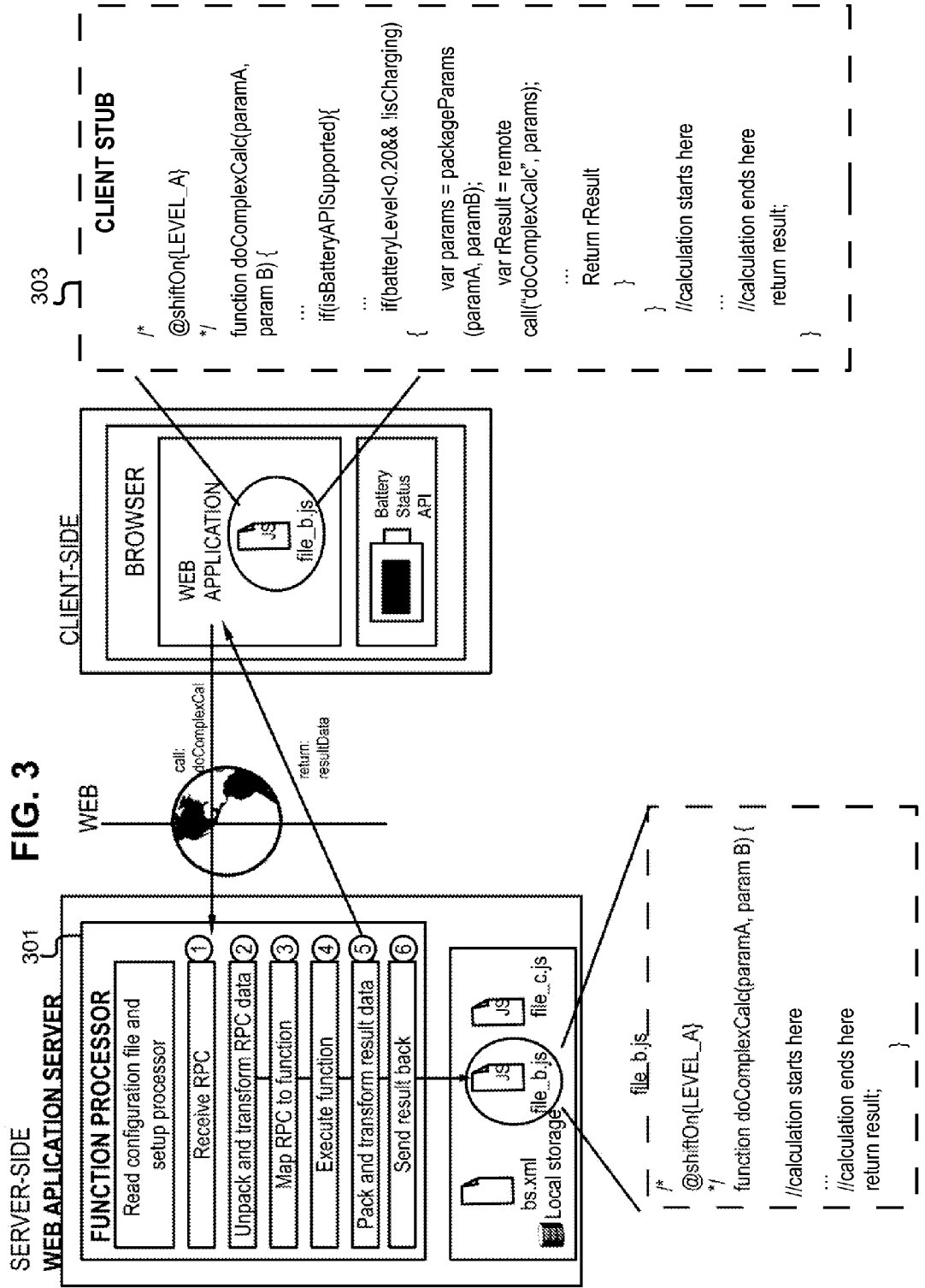
FIG. 3 is a block diagram illustrating the function processor.

Referring now to FIG. 3, a block diagram of the procedure of the Function Processor 301 will now be discussed and described. The Function Processor 301 procedure is defined by the following steps which are processed in the order listed below.

Read Configuration File and Setup Processor. This is the initialization step of the Function Processor 301 which occurs only once while the Function Processor 301 is created and bound to the RPC system or framework. There are numerous types and implementations of RPC frameworks which provide a comfortable handling of RPCs on web servers using known techniques.

During the initialization step, the Function Processor 301 reads a defined configuration file from the local storage of the server which is used to configure the behavior of the Function Processor 301. After the configuration file has been parsed and processed, the configuration data is internally stored by the Function Processor 301. This data is used later to determine the types of code files which have to be processed by the Function Processor 301.

1. Receive RPC

This step is part of the classic remote procedure call approach and can be covered by an existing system and solutions. It includes the establishing of the connection, the receiving of the data over the web, and the passing of the RPC data.

2. Unpack and Transform RPC Data

In this step, the function parameter data passed by the RPC is unpacked and transformed, for example in the original JavaScript object model. The parameter data of the function has been transformed, for example, into a JSON (JavaScript Object Notation) by the Client Stub 303, to transfer the data via the RPC. This object notation can be transformed back and passed to the target function for the subsequent execution.

3. Map RPC to Function

In this step, all code files parsed by the Stub Generator are scanned for the target function matching the function described within the RPC. Once the function has been found, the corresponding code file is loaded into the cross-platform environment so that the function can be executed on the server-side. In addition the system configuration is checked for defined dependencies. If any dependency has been found for the function, the corresponding code files are also loaded into the cross-platform environment and defined as a dependency of the previously loaded code file.

4. Execute Function

In this step the function is executed using the runtime of the cross-platform environment (for example, Node.js) and the result object/data is returned to the Function Processor 301. As the function is executed on the server-side environment and not within the client runtime environment, the function does not have any data dependency on the global data structure of the client (for example, a global variable). The function calculation and the function result have to be related only on the input parameter data of the function. The function can be allowed to access persistent states stored in the server-side storage or database as input for the calculation.

5. Pack and Transform Result Data

In this step the result is packed and transformed, for example, into a JSON structure, to be sent back to the client via the RPC response.

6. Send Result Back

In this last step the packed and transformed result, such as the JSON structure, is sent back to the client stub using the RPC response mechanism.

C. The Client Stub

The Client Stub is responsible for the transparent shifting of a function execution between the client and the server depending on the battery status of the mobile device. Every annotated function, for example, can be extended with the Client Stub code as described in FIG. 1.

Figure 4:
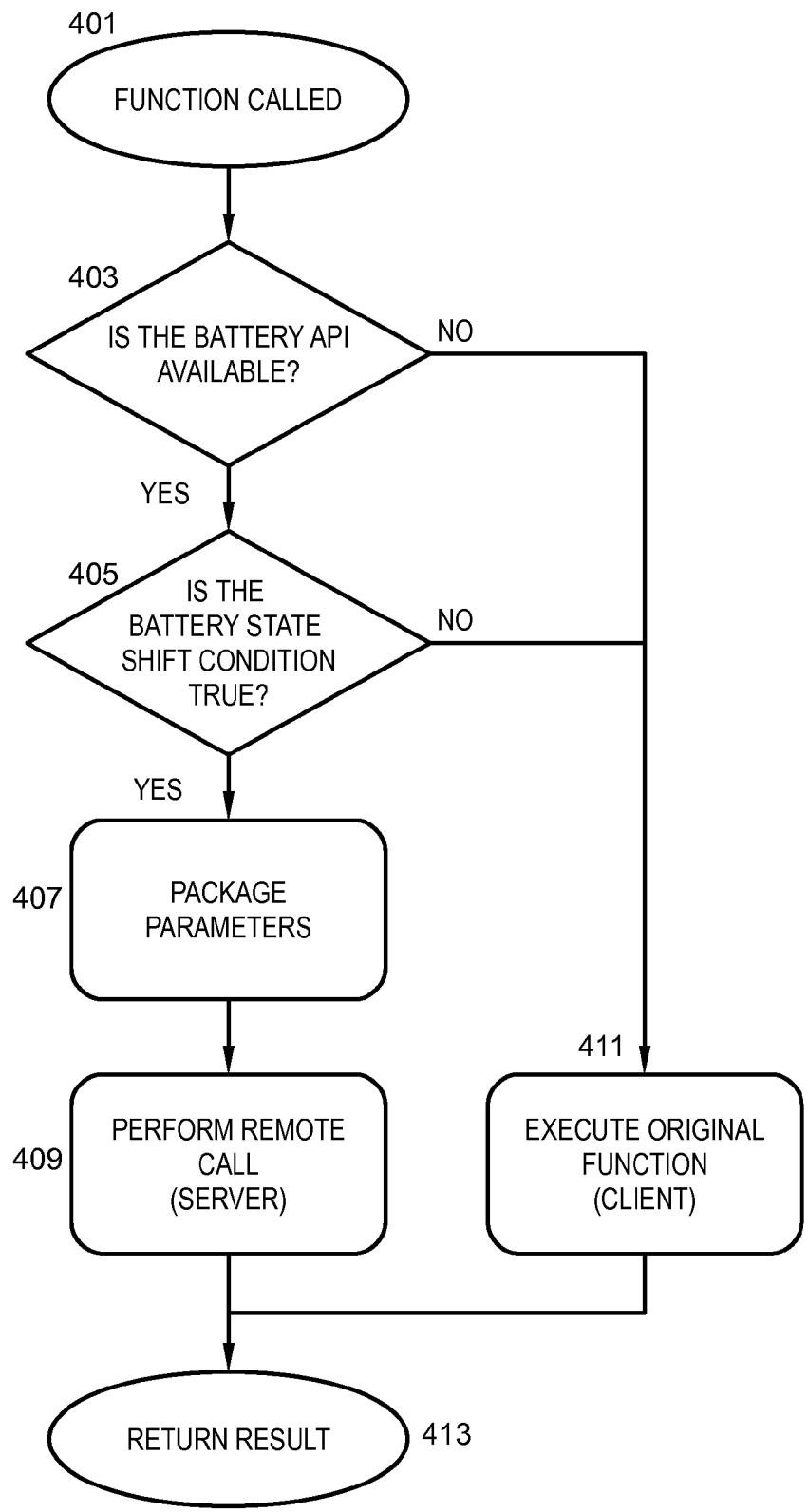
FIG. 4 is a flowchart illustrating the client stub process.

FIG. 4 is a flowchart illustrating the Client Stub process. The Client Stub performs the algorithm described in FIG. 4 to decide whether the called function execution which ordinarily executes on the client-side should be shifted to the server-side. In this example, the client shift condition (CSC) is battery-related, and intends to shift processing to the server to preserve battery power. Note that the client shift condition is not limited to battery status, but can be any condition that impacts a client-side function and for which a predetermined status of the condition will trigger a switch away from processing as usual on the client side. Other client shift conditions could be, for example but without limitation, a low network connectivity area of a mobile device, excessive data usage at the client side, or other situations as may be recognized from time to time; a process such as an API is provided using known techniques to check the status of the shift condition.

In the Client Stub process, a function can be called 401, for example, on the server side, and the appropriate function parameters for the original function that is called are obtained, all in accordance with known techniques. After the function is called 401 but before it is executed, the Client Stub process can check 403 whether a battery API is provided by the client. In this example, the battery API is conventional. If no battery API is supported or in case that the provided API does not offer the possibility to determine the battery status, the original function which was called is executed 411 as usual. If the battery API check was successful, the Client Stub process checks 405 whether the battery status fulfills the condition for a shift. If that is the case, then the input parameters of the original function are packaged 407 and the corresponding function is caused to be executed on the server-side by performing 409 a remote call while passing the packaged original function parameters; the server is expected to provide the function result in the return value of the remote call. In this case the execution of the original function will be skipped and the return value of the remote call is returned 413 as the function result.

The flow chart of FIG. 4 can be executed on a computer system such as discussed below in connection with FIG. 5, or other apparatus appropriately configured.

If the conditions for a shift are no longer fulfilled at any time during the remote execution of the corresponding function, the function is no longer executed on the server-side and is "shifted back" to the client, so the shift is not restricted to one direction only. This means that the function can move once or several times from the client to the server, and from the server to the client, depending on the battery status of the device, which is representative of the client shift condition (CSC).

To shift a function call execution from the client to the server, all function parameters can be packaged (such as stringified) so that the function input can be transferred to the server. In a web (html) based mobile application the packaging can be achieved by translating the function parameters into JSON. All modern JavaScript execution engine provides a JSON.stringify method which allows transforming a non-cyclic JavaScript object structure into a JSON representation.

The Client Stub can support, for example, two different kinds of functions (methods): a kind of function which defines a return value in its signature, and a kind of function which defines a callback handler as a parameter to provide a result to the executor of the function. If the function defines a return value in its signature, then the Client Stub can perform a synchronous remote call in the case that the function execution is to be shifted to the server. Due the fact that synchronous remote call will block (freeze) the client, this kind of function can be avoided. Functions which provide a callback handler in the parameter list can follow the following conventions: the callback handler can be a function which accepts exactly one parameter (the result of the function) and it is the first parameter of the original function. For this type of function the Client Stub can perform an asynchronous remote call to the server and pass the result to the callback handler of the original function.

D. System Configuration and Annotation Syntax

1. System Configuration

The Stub Generator and the Function Processor can be controlled by a system configuration file. This file can contain information about the code files to be processed by the Stub Generator and the Function Processor, about the dependencies of those files and information about battery status constants which can be used in the annotation shift conditions. The configuration file can be described in a human and machine-readable way using, for example, the XML markup language, although the configuration file can be implemented using other languages. The configuration file can be composed of the following XML elements which are provided by way of example and not limitation.

Listing 1 shows an example configuration file which illustrates a possible XML structure of the file.

Listing 1: Example Configuration

```
<?xml version="1.0" encoding="UTF-8"?>
<configuration>
<codeFiles>
    <files>
        <pattern>*.js</pattern>
        <pattern>*.jsp</pattern>
    <files>
    <sources>
        <path>./local/storage/path/js</path>
        <path>./local/storage/path/web</path>
    </sources>
</codeFiles>
<dependencies>
    <function name="doComplexCalc">
        <requires>fileName.js</requires>
        <requires>fileNameFoo.js</requires>
        <requires>fileNameBar.js</requires>
    </function>
    <function name="moreComplexCalc">
        <requires>fileName.js</requires>
        <requires>fileNameFoo.js</requires>
        <requires>fileNameBar.js</requires>
    </function>
</dependencies>
<constants>
    <batteryStatus name="good">
        charging==false &&
        dischargingTime > 14400
    </batteryStatus>
    <batteryStatus name="bad">
        charging==false &&
        dischargingTime < 1800
    </batteryStatus>
</constants>
</configuration>
```

Configuration-Element. The configuration element is the root element of the configuration and can contain all configuration elements of the configuration file. The following child elements can be allowed within this element: (1) codeFileS; (2) dependencies; and (3) constants.

CodeFile-Element. The codeFiles element can define a list of source paths for code files and a list of file patterns describing the code files processed by the Stub Generator and the Function Processor. The following child elements can be allowed within these elements: (1) files and (2) sources.

Files-Element. The file element contains a list of file patterns defining a regular expression describing the files processed by the Stub Generator and the Function Processor. The Stub Generator and the Function Processor process only code files whose filenames match one of the defined match patterns otherwise the requested file is ignored by the Stub Generator and the Function Processor. The following child elements can be allowed within this element: pattern.

Pattern-Element. The pattern element is a child element of the files element and defines a regular expression-matching pattern for files which have to be processed by the Stub Generator and the Function Processor. The Stub Generator and the Function Processor ignore files whose filenames do not match one of the defined expressions.

Sources-Element. The source element defines a list of source paths used by the Stub Generator and the Function Processor to look up code files. The following child element is allowed within this element: path.

Path-Element. The path element describes a file path within the local storage of the server used by Stub Generator and the Function Processor to look up code files.

Dependencies-Element. The dependencies element describes external dependencies for a specific function. If, for example, a function has references to functions not defined in the same code file, then dependencies can be defined in this section and the Function Processor ensures that the corresponding files are also loaded before the function is executed. The following child element is allowed within this element: function.

Function-Element. The function element describes a list of dependencies for a defined function. The name attribute of the element defined the function name of the function to which the dependencies belong. A dependency describes a list of code files containing functions used and required by the specified function. The following child element is allowed within this element: requires.

Requires-Element. The requires-element can define a code file that can contain, for example, functions or constants required for the execution of the function defined by the parent element. The function defined by the requires-element has to be located in one of the defined source paths.

Constants-Element. The constants element is used to define a list of predefined battery status possibilities which are used to simplify the definition of shift conditions by annotations. The annotations syntax is described in detail in the chapter below. The following child element is allowed within this element: batteryStatus.

BatteryStatus-Element. The batteryStatus element defines a predefined battery status which is used to simplify the definition of shift conditions by annotations. The name attribute of the element is used to assign a unique name to the battery status constant. This name is later used to refer to the constant.

2. Annotation Syntax

Function annotations can be used to provide a seamless and transparent shift of the function execution from the client-side to the server-side. The web developer needs to annotate only his function to get a function which automatically shifts its execution from the client-side to the serve-side when the battery status changes, for example. As described in the sections above, these annotations can be automatically recognized by the Stub Generator and the corresponding function can be extended seamlessly and transparently by an auto generated code (the Client Stub) which can provide the necessary functionality. The following annotations are representative of functionality which can be supported by the Stub Generator, and which can be adapted to various implementations. The set of supported annotations can be extended, for example to enhance the shifting functionality, and/or as desired.

| Tag | Syntax & Example |
|---|---|
| @batteryBased | @batteryBased<br>For example:<br>/**<br>* A complex function<br>* @batteryBased<br>*<br>/*<br>function doComplexCalc( ) {<br>...<br>}<br>Description<br><br>Marks a function to be enabled for the battery status based shift.<br>If no condition is defined for the corresponding function a simple condition check is performed shifting the execution to the server if the device battery is not charging.<br>Syntax & Example |
| @batteryCondition | @batteryCondition {Condition}<br>For example:<br>/**<br>* A complex function<br>* @batteryBased<br>* @batteryCondition {charging==false && dischargingTime < 1400}<br>*<br>/*<br>function doComplexCalc( ) {<br>...<br>}<br>Description<br><br>Specifies the condition for shifting the extraction from the client device to the server. The execution is shifted if the condition is true. The full syntax of the condition expression is described in the section below. |

3. Shift Condition Syntax.

The following provide examples of battery status attributes which can be checked, and which can be adapted to various implementations:

Charging (Boolean)

This can return the charging status of the battery. For example, the charging attribute can be set to false if the battery is discharging, and set to true if the battery is charging, the implementation is unable to report the state, or there is no battery attached to the device.

ChargingTime (Number)

This can return the charging time of the battery. For example, the chargingTime attribute returns the time in seconds left to fully charge the battery; the chargingTime attribute value can be set to 0, if the battery is full or there is no battery attached to the device, and to the value positive Infinity if the battery is discharging, the implementation is unable to report the remaining charging time, or otherwise.

DischargingTime (Number)

This can return the discharging time of the battery. For example, the dischargingTime attribute can return the time in seconds left to run out of power; the dischargingTime attribute value is set to positive Infinity, if the battery is charging, the implementation is unable to report the remaining discharging time, there is no battery attached to the device, or otherwise.

Level(Number)

This can return the level status of the battery. For example, the level attribute can return the value 0 if the device's battery is depleted and the device is out to be suspended and 1.0 if the battery is full, the implementation is unable to report the battery's level, or there is no battery attached to the system.

Conditional Statement Syntax

| Item | Syntax |
|---|---|
| value | integer ; double ; string ; boolean |
| symbol | attribute |
| comparison-operator | < ; > ; <= ; => ; == ; != |
| logical-operator | \|\| ; && |
| boolean-term | symbol comparison-operator value |
| expression | boolean-term logical-operator boolean-term;<br>boolean-term logical-operator (expression) |

Logical Operators

| Operator | Meaning |
|---|---|
| \|\| | TRUE if either or both terms are TRUE |
| && | TRUE if both terms are TRUE |

Comparative Operators

| Operator | Meaning |
|---|---|
| == | TRUE if left value is equal to right value |
| != | TRUE if left value is not equal to right value |
| > | TRUE if left value is greater than right value |
| >= | TRUE if left value is greater than or equal to right value |
| < | TRUE if left value is less than right value |
| <= | TRUE if left value is less than or equal to right value |

Condition Constants.

Furthermore, the @batteryCondition tag can allow referencing a battery status condition constant defined in the configuration file. This can be done, for example, by passing the constant name with a prefixed $ instead of a condition. The constant can be replaced the corresponding condition defined in the system configuration file. The following Listing 2 illustrates an example syntax, which can be adapted as desired to implementations.

Listing 2: Using Constants

```
/**
* A complex function
* @batteryBased
* @batteryCondition {$bad}
*
/*
function doComplexCalc( ) {
...
}
```

IV. Additional Example Implementation

Figure 5:
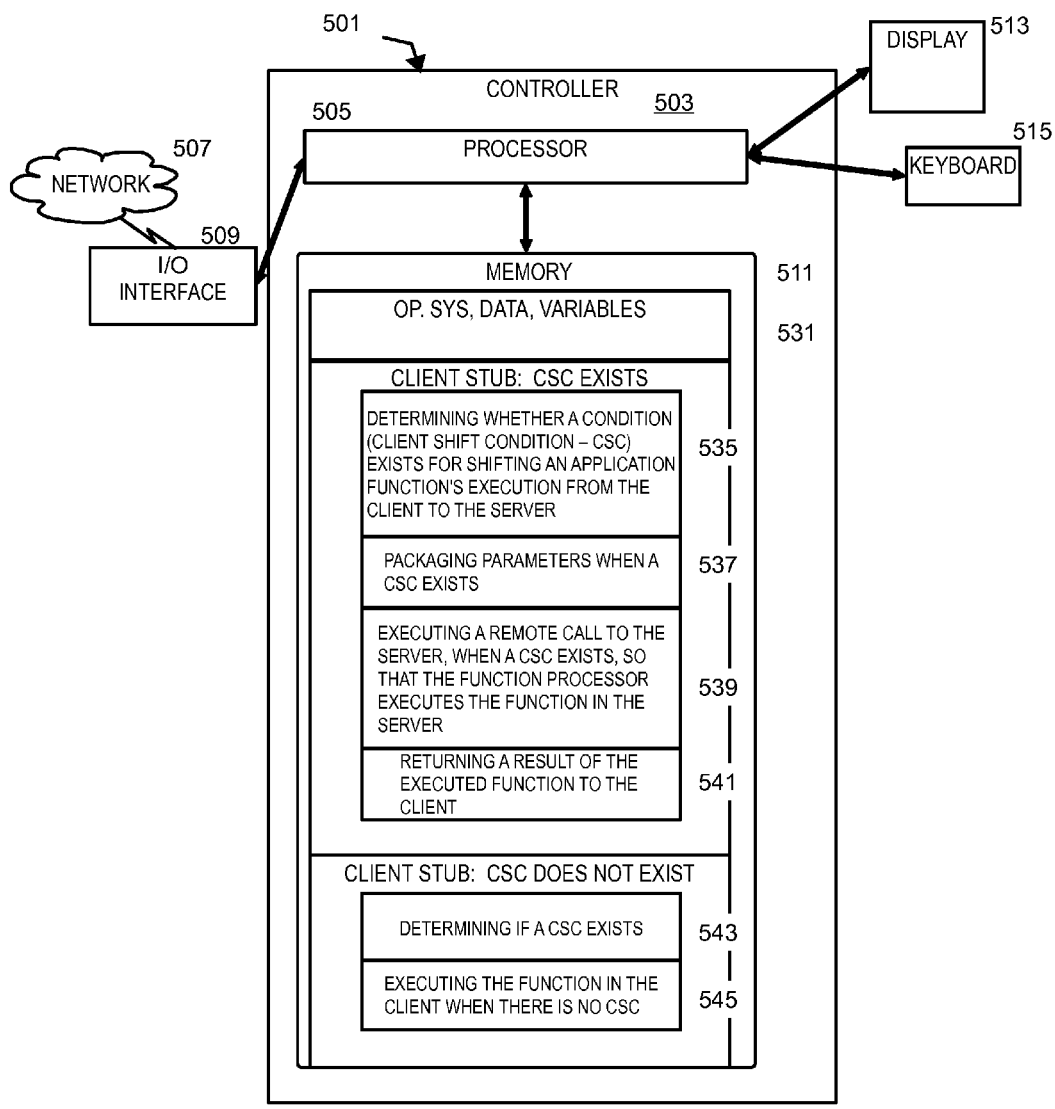
FIG. 5 is a block diagram that depicts relevant portions of a computer system.
Figure 6:
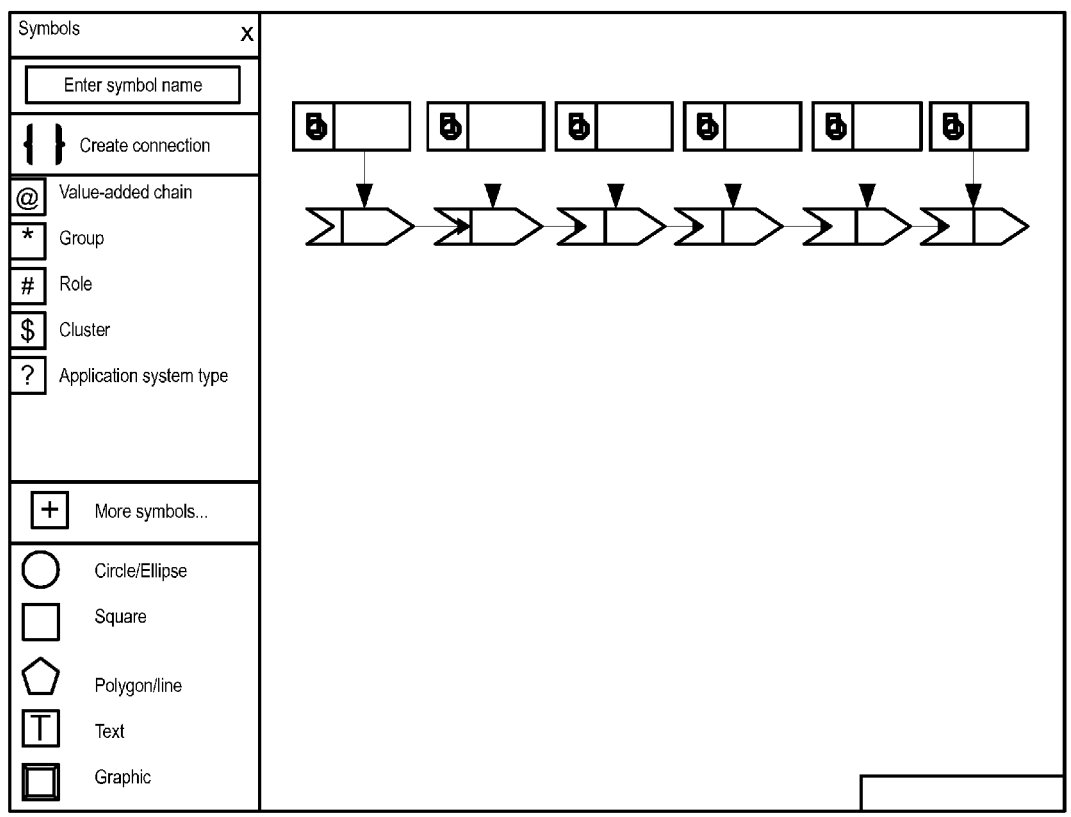
FIG. 6 is a block diagram illustrating an example of an ARIS model.

Referring now to FIG. 5, a block diagram illustrating relevant portions of a computer system 501 will be discussed and described. The illustrated computer system can function as the client-side which can include the client stub. The computer system 501 may include one or more controllers 503, a processor 505, an input/output (i/o) interface 509 for communication such as with a network 507, a memory 511, a display 513 (optional), and/or a user input device such as a keyboard 515 (optional). Alternatively, or in addition to the keyboard 515, a user input device may comprise one or more of various known input devices, such as a keypad, a computer mouse, a touchpad, a touch screen, and/or a trackball. The display 513 may present information to the user by way of a conventional liquid crystal display (LCD) or other visual display, and/or by way of a conventional audible device (for example, a speaker) for playing out audible messages. Portions of the computer system 501 are well understood to those of skill in this area and have been omitted to avoid obscuring the discussion.

The processor 505 may comprise one or more microprocessors and/or one or more digital signal processors. The memory 511 may be coupled to the processor 505 and may comprise a read-only memory (ROM), a random-access memory (RAM), a programmable ROM (PROM), and/or an electrically erasable read-only memory (EEPROM). The memory 511 may include multiple memory locations for storing, among other things, an operating system, data and variables 531 for programs executed by the processor 505; computer programs for causing the processor to operate in connection with various functions such as determining 535 whether a condition (client shift condition—CSC) exists for shifting an application function's execution from the client to the server; packaging 537 parameters when a CSC exists; executing 539 a remote call to the server, when a CSC exists, so that a function processor, located in the server, executes the function in the server with the parameters which were packaged and sent to the server with the RPC; receiving 541 a result of the executed function which is returned by the server to the client; determining 543 if a CSC does not exist or no longer exists; and executing 545 the function as usual in the client when a CSC does not exist or no longer exists.

The computer programs may be stored, for example, in ROM or PROM and may direct the processor 505 in controlling the operation of the computer 501. Each of these functions is considered in more detail herein, to the extent that it is not detailed elsewhere in this document.

Furthermore, a server (not illustrated) may include a stub generator (not illustrated) which is programmed to configure the client stub with the computer programs that cause the processor to operate in connection with the functions 535, 537, 539, 541, 543, 545 related to the client shift condition and for shifting the application function's execution from the client to the server.

The user may invoke functions accessible through the user input device such as the keyboard 515. The user input device may comprise one or more of various known input devices, such as a keyboard (515, illustrated) and/or a pointing device, such as a mouse; the keyboard 515 may be supplemented or replaced with a scanner, card reader, or other data input device; and the pointing device may be a mouse, touch pad control device, track ball device, or any other type of pointing device.

Responsive to manual signaling from the user input device represented by the keyboard 515, in accordance with instructions stored in memory 511, and/or automatically upon receipt of certain information via the i/o interface 509, the processor 505 may direct the execution of the stored programs.

The computer system 501 can access a server (not illustrated) over the network 507, or access the server locally over a wired and/or wireless connection. Techniques are well known for communications between a client and a server.

The processor 505 may be programmed for determining whether a condition (client shift condition—CSC) exists for shifting an application function's execution from the client to the server. This has been discussed in detail above.

The processor 505 may be programmed for packaging parameters for the application function's execution on the client, and passing the packaged parameters to the server, when the CSC is determined to exist.

The processor 505 may be programmed for executing a remote call to the server, when the CSC is determined to exist, so that a function processor, located in the server, executes on the server the function with the packaged parameters in response to the remote call.

The processor 505 may be programmed for receiving a result of the executed function which is executed with the packaged parameters by the function processor in the server; the result is returned from the server to the client.

The processor 505 may be programmed for determining whether the CSC does not exist or no longer exists.

The processor 505 may be programmed for executing the function in the client, when the CSC is determined to not exist or no longer exist.

As will be understood in this field, besides the functions discussed above, the memory 511 can include other miscellaneous information in a misc. database, not shown, along with the usual temporary storage and other instructions for other programs not considered herein.

The computer 501 can accommodate one or more disk drives or removable storage (not illustrated). Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external. The processor 505, memory 511, a disk drive and/or removable storage medium are referred to as "computer-readable storage media" and provide non-transitory storage of computer programs and data.

It should be understood that FIG. 5 is described in connection with logical groupings of functions or resources. One or more of these logical groupings may be performed by different components from one or more embodiments. Likewise, functions may be grouped differently, combined, or augmented without parting from the scope. Similarly the present description may describe various databases or collections of data and information. One or more groupings of the data or information may be omitted, distributed, combined, or augmented, or provided locally and/or remotely without departing from the scope.

V. Glossary

Terms as used herein are intended to be interpreted first, as understood to one of skill in the art at a first level, of client-server technologies and mobile devices that run applications; and if not interpretable at the first level, then at a second level as understood to one of skill in the art of computer science; and then if not interpretable according to the first level and second level, according to a more general dictionary.

The claims may use the following terms, which are defined to have the following meanings for the purpose of the claims herein. Other definitions may be specified in this document.

The term "computer system" or "computer" used herein denotes a device sometimes referred to as a computer, laptop, personal computer, personal digital assistant, notebook computer, personal assignment pad, server, client, mainframe computer, or evolutions and equivalents thereof, unless further limited by context or by express statements.

The term "API" or "application programming interface" is used herein to denote an application-programming interface, which specifies how software components should interact with each other. An API utilizes conventional techniques and can be used to ease the work of programming graphical user interface components.

The phrase "automatically without manual intervention," when used in a claim, is defined to mean that the particular step occurs after the step is initiated until limitations recited in the step are finished without requiring a user to provide input to a processor.

VI. Implementation and Technical Notes

The above discussion has assumed that the reader has a sufficient technical background for appreciating the points made. This section provides some supplementary implementation and/or technical notes which discuss some technical information that may be relevant.

This discussion has involved particular examples. However, the principles may be applied to other examples and/or realizations. Naturally, the relevant data may differ, as appropriate; and/or the code may be adapted to different realizations. Further, an embodiment may be used by numerous users, if preferred, and/or can be provided and/or accessed over distributed systems.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or one or more integrated circuits (ICs), such as a central processing unit (CPU) which is the hardware that carries out instructions of a computer program, and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

The various embodiments which demonstrate a method and/or system for condition-based application logic shifting between a client and a server in a system containing a stub generator, a function processor, and a client stub generated by the stub generator have been discussed in detail above. It should be further noted that the above-described processes can be stored as instructions in computer-readable storage medium. When the instructions are executed by a computer, for example after being loaded from a computer-readable storage medium, the process(es) are performed.

The detailed descriptions, which appear herein, may be presented in terms of program procedures executed on a computer or a network of computers. These procedural descriptions and representations herein are the means used by those skilled in the art to most effectively convey the substance of their work to others skilled in the art.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the discussion herein may contemplate the use of an operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

A computer-readable storage medium is tangible and non-transitory; a computer-readable storage medium can be any of the memory or storage devices, such as those examples described above, or other removable or fixed storage medium, provided such computer-readable storage medium is tangible and non-transitory.

Furthermore, any communication network implicated in an embodiment can include, by way of example but not limitation, data and/or packet communications networks, which can provide wireless communications capability and/or utilize wireline connections such as cable and/or a connector, or similar. Any appropriate communication protocol may be used.

The computer and/or system embodied in connection herewith may (or may not) rely on the integration of various components including, as appropriate and/or if desired, by way of example but not limitation, hardware and software servers, applications software, database engines, server area networks, firewall and SSL security, production back-up systems, and/or applications interface software. An embodiment may be, by way of example but not by way of limitation, network-based and may (or may not) utilize a network such as the Internet or other network as an exemplary interface with the user for any information delivery.

One or more databases implicated by the above discussion may be, by way of example but not limitation, in a relational database format, but other standard data formats may also be used. Optionally, the various databases may include a known conversion system capable of receiving data in various standard formats.

One or more displays for the system may be developed in connection with, by way of example but not limitation, HTML display format. Although HTML may be a preferred display format, it is possible to utilize alternative display formats for interacting with a user and obtaining user instructions.

Further, an embodiment has been discussed in certain examples as if it is made available by a provider to a single customer with a single site. An embodiment may be used by numerous users, if preferred, and the users can be at one or more sites.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A computer system comprising:
a client, including at least a processor and a memory, and a server that implement condition-based application logic shifting between the client and server, a stub generator and a function processor being located in the server, the function processor executing a function, and a client stub being generated by the stub generator,
wherein the stub generator is programmed to configure the client stub to, in a condition shift cycle:
initially and dynamically determine whether a client shift condition (CSC) exists for shifting an application function's execution from the client to the server;
package parameters for the application function's execution on the client, and pass the packaged parameters to the server, when the CSC is initially determined to exist;
execute a remote call to the server, when the CSC is initially determined to exist, so that the function processor in the server executes the function with the packaged parameters; and
receive a result, returned from the server to the client, of the executed function which is executed with the packaged parameters by the function processor in the server;
when the CSC is initially determined to exist, secondly and dynamically determine if the CSC no longer exists or continues to exist; and
execute the function in the client, when it is secondly determined that the CSC no longer exists, and wherein the client stub is a piece of code injected by the stub generator at the beginning of the application function.

2. The computer system of claim 1, wherein the stub generator is configured to:
read a configuration file from storage located in the server;
read and parse a returned code file, from a web application server, that represents the function;
generate the client stub based on the configuration file and the CSC defined for the corresponding function and add the client stub to the returned code file, to generate a modified code file;
add helper functions to be used by the client stub to the modified code file; and
return the modified code file to the web application server.

3. The computer system of claim 1, wherein the function processor is configured to:
read a configuration file from storage located in the server;
receive remote procedure call data from the client;
unpack and transform the remote procedure call data that was received from the client;
map the remote procedure call data, which is unpacked and transformed, with the function to be executed based on the configuration file;
execute the function that is mapped with the remote procedure call data that is unpacked and transformed;
pack and transform a result of the executed function; and
return the result of the executed function, which is packed and transformed, to the client stub in the client.

4. A method implemented in a computer system comprising a client, including at least a processor and a memory, and a server, a stub generator and a function processor being located in the server, and a client stub being generated by the stub generator, the method comprising a condition shift cycle including:
initially and dynamically determining, by the client stub executing on the client, whether a client shift condition (CSC) exists for shifting an application function's execution from the client to the server;
packaging, by the client stub on the client, parameters for the application function's execution on the client, and passing the packaged parameters to the server, when the CSC is initially determined to exist;
executing, by the client stub on the client, a remote call to the server, when the CSC is initially determined to exist, so that a function processor, located in the server, executes on the server the function with the packaged parameters in response to the remote call;
returning, from the server to the client, a result of the executed function which is executed with the packaged parameters by the function processor in the server;
secondly and dynamically determining, when the CSC is initially determined to exist, if the CSC no longer exists or continues to exist; and
executing the function in the client, when it is secondly determined that the CSC no longer exists, wherein
the client stub is a piece of code injected by the stub generator at the beginning of the application function.

5. The method of claim 4, further comprising:
in response to the stub generator:
reading, by the server, a configuration file from storage located in the server;
reading and parsing, by the server, from a web application server, a returned code file that represents the function;

generating, by the server, the client stub based on the configuration file and the CSC defined for the corresponding function and adding it to the returned code file, to generate a modified code file;

adding, by the stub generator, to the modified code file, helper functions to be used by the client stub; and returning, from the stub generator on the server, to the web application server, the modified code file.

6. The method of claim 4, further comprising:

in response to the function processor:

reading, by the server, from file storage located in the server, a configuration file;

receiving, by the server from the client, remote procedure call data;

unpacking and transforming, by the server, the remote procedure call data that was received from the client;

mapping, by the server, the remote procedure call data, which is unpacked and transformed, with the function to be executed based on the configuration file;

executing, by the server, the function that is mapped with the remote procedure call data that is unpacked and transformed;

packing and transforming, by the server, a result of the executed function; and returning, from the server to the client stub in the client, the result of the executed function which is packed and transformed.

7. A non-transitory computer readable medium comprising executable instructions for a method implemented in a computer system comprising a client, including at least a processor and a memory, and a server, a stub generator and a function processor being located in the server, and a client stub being generated by the stub generator, the instructions being executed in the computer system to perform a condition shift cycle including:

initially and dynamically determining, by the client stub executing on the client, whether a client shift condition (CSC) exists for shifting an application function's execution from the client to the server;

packaging, by the client stub on the client, parameters for the application function's execution on the client, and passing the packaged parameters to the server, when the CSC is initially determined to exist;

executing, by the client stub on the client, a remote call to the server, when the CSC is initially determined to exist, so that a function processor, located in the server, executes on the server the function with the packaged parameters in response to the remote call;

returning, from the server to the client, a result of the executed function which is executed with the packaged parameters by the function processor in the server;

secondly and dynamically determining, when the CSC is initially determined to exist, if the CSC no longer exists or continues to exist; and executing the function in the client, when it is secondly and dynamically determined that the CSC no longer exists, wherein the client stub is a piece of code injected by the stub generator at the beginning of the application function.

8. The non-transitory computer readable medium of claim 7, further comprising instructions being executed in the computer system to perform:

in response to the stub generator:

reading, by the server, a configuration file from storage located in the server;

reading and parsing, by the server, from a web application server, a returned code file that represents the function;

generating, by the server, the client stub based on the configuration file and the CSC defined for the corresponding function and adding it to the returned code file, to generate a modified code file;

adding, by the stub generator, to the modified code file, helper functions to be used by the client stub; and returning, from the stub generator on the server, to the web application server, the modified code file.

9. The non-transitory computer readable medium of claim 7, further comprising instructions being executed in the computer system to perform:

in response to the function processor:

reading, by the server, a configuration file from storage located in the server;

receiving, by the server from the client, remote procedure call data;

unpacking and transforming, by the server, the remote procedure call data that was received from the client;

mapping, by the server, the remote procedure call data, which is unpacked and transformed, with the function to be executed based on the configuration file;

executing, by the server, the function that is mapped with the remote procedure call data that is unpacked and transformed;

packing and transforming, by the server, a result of the executed function; and returning, from the server to the client stub in the client, the result of the executed function which is packed and transformed.

10. The computer system of claim 1, wherein the stub generator is programmed to further configure the client stub, in the condition shift cycle, when it is initially determined that the CSC does not exist, to execute the function in the client.

11. The computer system of claim 10, wherein the stub generator is programmed to further configure the client stub, in the condition shift cycle, when it is secondly determined that the CSC continues to exists, to refrain from executing the function as the function processor in the server continues to execute the function with the packaged parameters.

12. The computer system of claim 11, wherein the stub generator is further programmed to configure the client stub to perform the condition shift cycle repeatedly such that function execution moves one or more times from the client to the server, and possibly from the server to the client, depending on whether the CSC exists, does not exist, continues to exist, or no longer exists.

13. The method of claim 4, further comprising in the condition shift cycle, when it is initially determined that the CSC does not exist, executing the function in the client by the client stub.

14. The method of claim 13, further comprising in the condition shift cycle, when it is secondly determined that the CSC continues to exists, refraining from executing the function in the client by the client stub as the function processor in the server continues to execute the function with the packaged parameters.

15. The method of claim 14, further comprising performing the condition shift cycle repeatedly by the client stub such that function execution moves one or more times from the client to the server, and possibly from the server to the client, depending on whether the CSC exists, does not exist, continues to exist, or no longer exists.

16. The non-transitory computer readable medium of claim 7, further comprising instructions being executed in the computer system to perform:

in the condition shift cycle, when it is initially determined that the CSC does not exist, executing the function in the client by the client stub.

17. The non-transitory computer readable medium of claim 16, further comprising instructions being executed in the computer system to perform:

in the condition shift cycle, when it is secondly determined that the CSC continues to exists, refraining from executing the function in the client by the client stub as the function processor in the server continues to execute the function with the packaged parameters.

18. The non-transitory computer readable medium of claim 17, further comprising instructions being executed in the computer system to perform:

performing the condition shift cycle repeatedly by the client stub such that function execution moves one or more times from the client to the server, and possibly from the server to the client, depending on whether the CSC exists, does not exist, continues to exist, or no longer exists.

19. The computer system of claim 11, wherein
the stub generator configures the client stub to perform the condition shift cycle by appending a function annotation to the application function.

20. The method of claim 14, wherein
the condition shift cycle is performed by appending a function annotation to the application function.

21. The non-transitory computer readable medium of claim 17, wherein
the instructions executed in the computer system to perform the condition shift cycle include a function annotation appended to the application function.

* * * * *